Shaw & Leavitt.
Millstone Dress.
No. 3,122. Reissued Sept. 15, 1868.
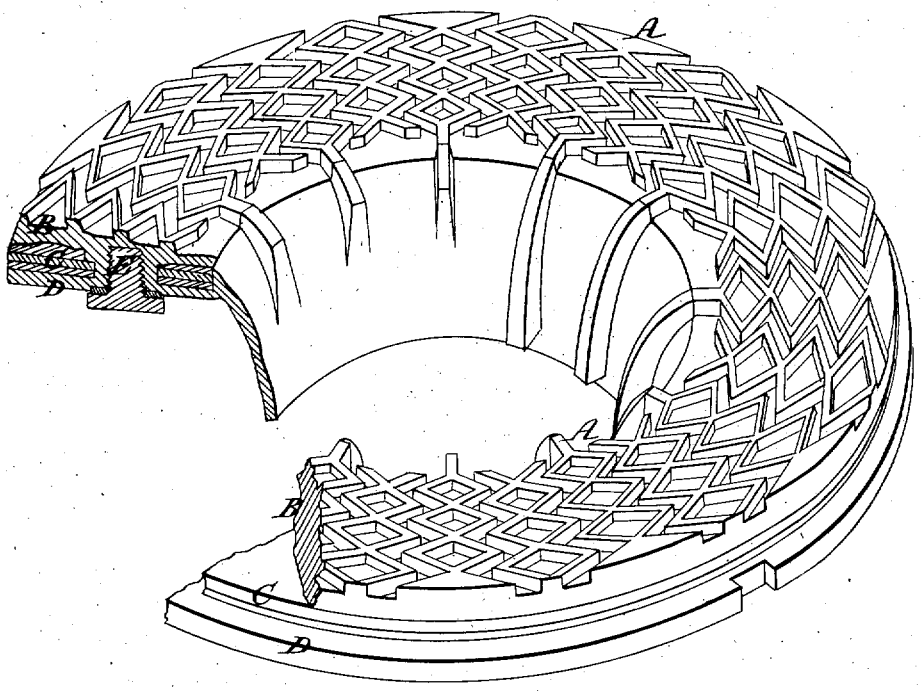
WITNESSES.
H. S. Blood
H. N. Jenkins
INVENTOR.
Henry Shaw
W. D. Leavitt

United States Patent Office.

HENRY SHAW AND WILLIAM D. LEAVITT, OF NEW ORLEANS, LOUISIANA.

*Letters Patent No.* 79,865, *dated July* 14, 1868; *reissue No.* 3,122, *dated September* 15, 1868.

IMPROVEMENT IN GRINDING-PLATES FOR GRIST-MILLS.

The Schedule referred to in these Letters Patent and making part of the same.

TO ALL WHOM IT MAY CONCERN:

Be it known that we, HENRY SHAW and WILLIAM D. LEAVITT, of the city of New Orleans, and State of Louisiana, have invented a certain new, useful, and improved Mode of Constructing the Opposing Grinding-Parts of Cast-Iron Grist-Mills; and we do hereby declare the following to be a full, clear, and exact description of the same, reference being had to the annexed drawing, making a part of this specification, on which is exhibited a perspective view of one of the grinding-parts of such a mill, with a part broken away, in order to show clearly the novel features that distinguish and constitute our invention.

Our invention consists of a division of each opposing grinding-part of a cast-iron grist-mill into three distinct sections or parts, in such a manner as that whilst the two face or grinding-plates proper respectively shall be very thin, and of ring-like or annular formation, and the back or supporting-plates sufficiently massive to avoid all danger of yielding or breaking, the intermediate or central section shall be composed of some unyielding, non-conducting substance, and not of cast iron, as are the face and back sections, with a view to prevent such an accumulation of heat from the friction of the rubbing-surfaces as will produce destructive or even injurious effects upon the meal that is ground in the mill.

Superadded to these improvements, thus in general terms indicated, we have devised a peculiar "dress," of a system of diamond-shaped projections, which, radiating in rows or lines from the centre of each face-plate or section, are so arranged that in the revolution of the rotating plate against the stationary one, a multitude of cutting-edges come together, after the manner of a pair of shears, and cut the grain, instead of crushing it, as in the case of most other mills that are known to us.

It will easily be perceived that this shearing or cutting-operation diminishes, to a certain extent, the tendency to overheating, and that hence our "dress" becomes an additional means of keeping down the temperature of the mill in the operation of grinding.

But our invention will be better understood by referring to the drawing, on which A represents a diamond-shaped dress upon the face-plate B of one of the parts of a mill constructed on our plan. D is the supporting back section, to which the face-plate B is secured by strong screw-bolts E, that pass through the intermediate unyielding non-conducting section C, which may be composed of gasket, paper, or any other equivalent substance.

The drawing shows only one of the grinding-parts, but it will be understood that there is another, of precisely similar construction or character.

In the practice of our invention, the leading object, to wit, the keeping down the heat to a sufficiently low temperature to prevent bad effects on the grist, is mainly accomplished by the thinness of the face-plates, and the interposition of the unyielding non-conducting intermediate section C, because, being thin, the face-plates can never be excessively heated, and resting upon the intermediate non-conducting sections, such heat as they may acquire cannot be communicated to the back sections D; but the dress has also some agency in the production of the same end, as well as the currents of air that are put in motion by the rapid revolution of one of the parts whenever the mill is in operation. The effect produced by these currents of air is far more prompt and pronounced than it would be if the face-plates were thick, or the two opposing parts consisted of solid or single castings.

Having thus described our invention, what we claim, and desire to secure by Letters Patent, is—

The combination and arrangement of the cast-iron grinding-plate B, the unyielding non-conducting paper packing C, and back plate D, all constructed and secured together substantially in the manner and for the purpose herein described.

HENRY SHAW,
W. D. LEAVITT.

Witnesses:
RUFUS R. RHODES,
A. HERO, Jr.